United States Patent
Zhang et al.

(10) Patent No.: US 10,567,012 B2
(45) Date of Patent: Feb. 18, 2020

(54) RADIO FREQUENCY FRONT END, TERMINAL DEVICE, AND CARRIER AGGREGATION METHOD

(71) Applicant: HUAWEI TECHNOLOGIES CO., LTD., Shenzhen, Guangdong (CN)

(72) Inventors: Heping Zhang, Shenzhen (CN); Jian Chen, Shenzhen (CN); Guangsheng Pan, Shenzhen (CN); Dingjie Wang, Shenzhen (CN); Hugen Qin, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/770,969

(22) PCT Filed: Apr. 29, 2016

(86) PCT No.: PCT/CN2016/080662
§ 371 (c)(1),
(2) Date: Apr. 25, 2018

(87) PCT Pub. No.: WO2017/185328
PCT Pub. Date: Nov. 2, 2017

(65) Prior Publication Data
US 2018/0331716 A1   Nov. 15, 2018

(51) Int. Cl.
*H04B 1/00* (2006.01)
*H04B 1/52* (2015.01)

(52) U.S. Cl.
CPC .............. *H04B 1/00* (2013.01); *H04B 1/006* (2013.01); *H04B 1/0057* (2013.01); *H04B 1/52* (2013.01)

(58) Field of Classification Search
CPC ........ H04B 1/00; H04B 1/0057; H04B 1/006; H04B 1/52
See application file for complete search history.

(56) References Cited

U.S. PATENT DOCUMENTS

2009/0093270 A1   4/2009   Block et al.
2012/0306591 A1   12/2012  Nishihara et al.
(Continued)

FOREIGN PATENT DOCUMENTS

CN   102811032 A   12/2012
CN   103684481 A   3/2014
(Continued)

OTHER PUBLICATIONS

Chinese Office Action issued in Chinese Application No. 201680011513.x dated Mar. 4, 2019, 10 pages.
(Continued)

*Primary Examiner* — Jae Y Lee
(74) *Attorney, Agent, or Firm* — Fish & Richardson P.C.

(57) ABSTRACT

Example radio frequency front ends, terminal devices, and carrier aggregation methods are provided. In one example, the radio frequency front end includes: P transmit branches, each transmit branch includes at least one transmit filter, N receive branches, where each receive branch includes at least one receive filter, and a switch circuit having L input ports and at least one output port, where the at least one output port is connected to an antenna or a back end circuit of an antenna, and where the L input ports are used to simultaneously connect a transmit branch of the P transmit branches and a receive branch of the N receive branches, where the transmit branch and the receive branch are corresponding to a same frequency band.

16 Claims, 6 Drawing Sheets

(56) References Cited

U.S. PATENT DOCUMENTS

| | | | |
|---|---|---|---|
| 2013/0043946 A1 | 2/2013 | Hadjichristos et al. | |
| 2013/0273861 A1 | 10/2013 | See | |
| 2014/0073268 A1 | 3/2014 | Taniuchi et al. | |
| 2014/0112213 A1 | 4/2014 | Norholm et al. | |
| 2014/0329475 A1 | 11/2014 | Ellä et al. | |
| 2015/0018043 A1* | 1/2015 | Taniuchi | H03H 7/465 |
| | | | 455/561 |
| 2017/0195997 A1 | 7/2017 | Fukuta et al. | |
| 2018/0309464 A1* | 10/2018 | Mandegaran | H04B 1/52 |

FOREIGN PATENT DOCUMENTS

| | | |
|---|---|---|
| CN | 103733522 A | 4/2014 |
| CN | 103780278 A | 5/2014 |
| CN | 103814526 A | 5/2014 |
| CN | 104247149 A | 12/2014 |
| JP | 2016039432 A | 3/2016 |
| WO | 2016047514 A1 | 3/2016 |

OTHER PUBLICATIONS

International Search Report issued in International Application No. PCT/CN2016/080662 dated Feb. 8, 2017, 6 pages.

Office Action issued in Japanese Application No. 2018/526,896 dated May 30, 2019, 20 pages (With English Translation).

Office Action issued in Chinese Application No. 201680011513.X dated Nov. 14, 2019, 5 pages.

Yi Xu, "Communication electronics," Xi'an University of Electronic Science and Technology Press, Aug. 31, 2003, 10 pages (partial English translation).

\* cited by examiner

RADIO FREQUENCY FRONT END, TERMINAL DEVICE, AND CARRIER AGGREGATION METHOD

CROSS-REFERENCE TO RELATED APPLICATIONS

This application is a National Stage of International Application No. PCT/CN2016/080662, filed on Apr. 29, 2016, which is hereby incorporated by reference in its entirety.

TECHNICAL FIELD

The present invention relates to the field of communications technologies, and in particular, to a radio frequency front end, a terminal device, and a carrier aggregation method.

BACKGROUND

Continuous development of wireless communications technologies poses higher requirements on a rate of wireless communications, and wireless communications protocols and technologies keep developing. To meet requirements on a better single-user peak rate and a higher system capacity, a direct method is increasing a system transmission bandwidth. Therefore, a technology for increasing the transmission bandwidth is introduced for a Long Term Evolution Advanced (English: Long Term Evolution Advanced, LTE-A for short) system, that is, a carrier aggregation (English: Carrier Aggregation, CA for short) technology.

The CA technology can aggregate at least two component carriers (English: Component Carrier, CC for short), to provide a higher transmission bandwidth, so that an uplink transmission rate and a downlink transmission rate are effectively improved. For example, it is assumed that a bandwidth of each CC is 20 MHz. If five CCs are aggregated, a transmission bandwidth of 100 MHz can be achieved.

To implement CA on a terminal device side, when a CA combination manner cannot be implemented by using a diplexer (Diplexer) for a CA combination of very closely contiguous communications frequency bands, there are generally two other implementations. One implementation is using a quadruplexer or a sextaplexer. The quadruplexer has four input ports and one output port. The four input ports are connected to two transmit channels and two receive channels, respectively. Therefore, carriers on two frequency bands can operate simultaneously, so that CA of two CCs can be implemented. Similarly, the sextaplexer has six input ports and one output port. The six input ports are connected to three transmit channels and three receive channels, respectively. Therefore, carriers on three frequency bands can operate simultaneously, so that CA of three CCs can be implemented.

The other implementation is connecting at least two duplexers (Duplexer). Each duplexer can receive and transmit signals on one frequency band. Therefore, if at least two duplexers are simultaneously connected, CA of at least two CCs can be implemented.

In the previous CA implementation, frequency bands are closely contiguous. Therefore, to eliminate interference between the frequency bands, a design is relatively difficult. In the latter CA implementation, a design of the duplexer itself is difficult, and a relatively great insertion loss of the duplexer affects radio frequency performance. As a result, in the prior art, it is difficult to design a radio frequency front end for implementing CA.

SUMMARY

Embodiments of the present invention provide a radio frequency front end, a terminal device, and a carrier aggregation method, so as to resolve a prior-art technical problem that it is difficult to design a radio frequency front end for implementing carrier aggregation.

According to a first aspect, an embodiment of the present invention provides a radio frequency front end, including:

P transmit branches, where each transmit branch is used to transmit a carrier modulation signal on one of M different frequency bands, each transmit branch includes at least one transmit filter, the transmit filter is a band-pass filter, a frequency band on which a carrier is allowed by the transmit filter to pass is consistent with the at least one frequency band on which transmitting is performed on each transmit branch, and M is an integer greater than or equal to 2; N receive branches, where each receive branch is used to receive a carrier modulation signal on at least one of the M different frequency bands, each receive branch includes at least one receive filter, the receive filter is a band-pass filter, a frequency band on which a carrier is allowed by the receive filter to pass is consistent with the at least one frequency band on which receiving is performed on each receive branch, and N is an integer greater than or equal to 1 and less than or equal to M; and a switch circuit having L input ports and at least one output port, where the output port is connected to an antenna or a back end circuit of an antenna, the L input ports are used to simultaneously connect a transmit branch of the P transmit branches and a receive branch of the N receive branches, where the transmit branch and the receive branch are corresponding to a same frequency band, L is an integer greater than or equal to 2, and P is an integer greater than or equal to 1 and less than or equal to M.

In a method according to the embodiments of the present invention, an independent transmit filter and an independent receive filter are used, and the transmit filter and the receive filter are simultaneously connected by using the switch circuit, to implement a function of a conventional duplexer. Therefore, a structure is simple, and design difficulty is small. In addition, uplink CA or downlink CA is implemented by connecting the transmit branch and the receive branch that are corresponding to at least two frequency bands.

With reference to the first aspect, in a first possible implementation of the first aspect, each transmit branch further includes an isolator or a phase-shift circuit, where the isolator or the phase-shift circuit is disposed between the transmit filter and the switch circuit; and the isolator or the phase-shift circuit is used to reduce mutual impact between the transmit filter and another transmit filter or the receive filter.

With reference to the first aspect or the first possible implementation of the first aspect, in a second possible implementation of the first aspect, each transmit branch further includes a matching network, the matching network of each transmit branch is disposed on at least one side of the transmit filter, and the matching network of each transmit branch is used to match a matching characteristic of the transmit filter.

With reference to the first aspect, the first possible implementation of the first aspect, or the second possible implementation of the first aspect, in a third possible implementation of the first aspect, each receive branch further includes a matching network, the matching network of each receive branch is disposed on at least one side of the receive filter, and the matching network of each receive branch is used to match a matching characteristic of the receive filter and reduce impact of the transmit filter on the receive filter.

With reference to any one of the first aspect or the first to the third possible implementations of the first aspect, in a fourth possible implementation of the first aspect, a quantity of the at least one frequency band on which receiving is performed on each receive branch is one, the receive filter is an independent filter, and N is equal to M. With this design, CA between different frequency bands can be implemented more flexibly.

With reference to any one of the first aspect or the first to the third possible implementations of the first aspect, in a fifth possible implementation of the first aspect, a quantity of the at least one frequency band on which receiving is performed on each receive branch is two or more, and the receive filter is a two-in-one or all-in-one filter. This design has less restriction on a quantity of the input ports of the switch circuit and requires a small area to be occupied on a circuit board, thereby facilitating a circuit design.

With reference to any one of the first aspect or the first to the fifth possible implementations of the first aspect, in a sixth possible implementation of the first aspect, a power tolerance of the receive filter is a transmit power of the transmit branch.

According to a second aspect, an embodiment of the present invention provides a terminal device, including:

an antenna, configured to radiate a modulation signal to space and receive an electromagnetic wave in the space; the radio frequency front end according to any one of the first aspect or the first to the sixth possible implementations of the first aspect, where the output port is connected to the antenna; and a controller, configured to control a connectivity status between the L input ports and the transmit branch and between the L input ports and the receive branch.

According to a third aspect, an embodiment of the present invention provides a carrier aggregation method, which is applied to the terminal device according to the second aspect, including:

determining at least two frequency bands for carrier aggregation; in downlink carrier aggregation, controlling the L input ports to simultaneously connect receive branches corresponding to the at least two frequency bands and a transmit branch corresponding to one of the at least two frequency bands; and in uplink carrier aggregation, controlling the L input ports to simultaneously connect transmit branches corresponding to the at least two frequency bands and a receive branch corresponding to one of the at least two frequency bands.

With reference to the third aspect, in a first possible implementation of the third aspect, the determining at least two frequency bands for carrier aggregation includes: determining the at least two frequency bands according to indication information received from a network-side device, where the indication information is used to indicate the at least two frequency bands.

With reference to the first possible implementation of the third aspect, in a second possible implementation of the third aspect, the indication information is further used to indicate a primary frequency band of the at least two frequency bands, and the one of the at least two frequency bands is the primary frequency band.

DESCRIPTION OF EMBODIMENTS

The embodiments of the present invention provide a radio frequency front end, a terminal device, and a carrier aggregation method, so as to resolve a prior-art technical problem that it is difficult to design a radio frequency front end for implementing carrier aggregation.

To make the purpose, technical solutions, and advantages of the embodiments of the present invention clearer, the following describes the technical solutions of the embodiments of the present invention with reference to the accompanying drawings in the embodiments of the present invention.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

Figure 1:
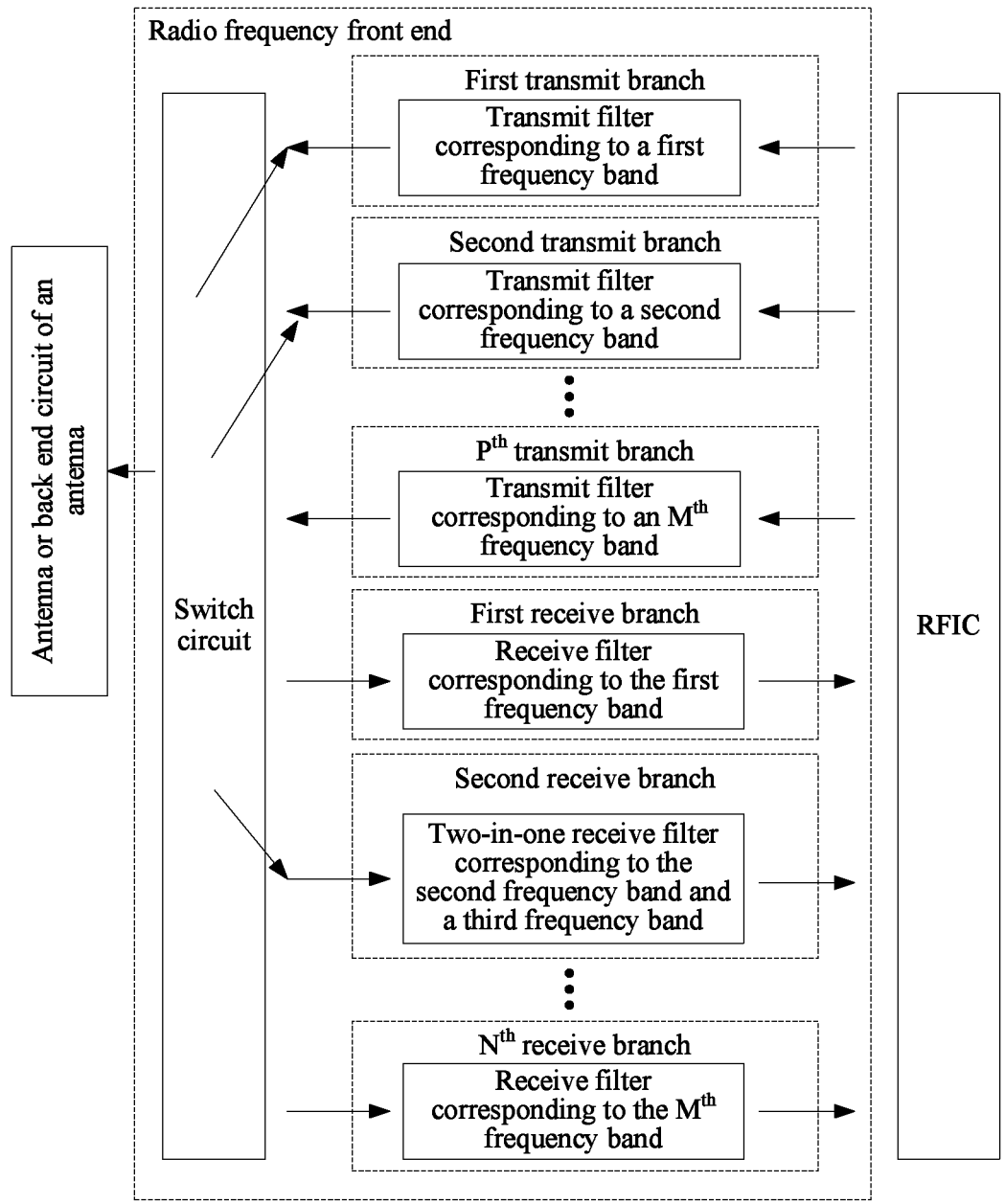
FIG. 1 is a structural diagram of a radio frequency front end according to an embodiment of the present invention.

Referring to FIG. 1, FIG. 1 is a structural diagram of a radio frequency front end according to an embodiment of the present invention. The radio frequency front end includes P transmit branches from a first transmit branch to an $M^{th}$ transmit branch, N receive branches from a first receive branch to an $N^{th}$ receive branch, and a switch circuit. M is an integer greater than or equal to 2, P is an integer greater than or equal to 1 and less than or equal to M, and N is an integer greater than or equal to 1 and less than or equal to M.

Each transmit branch includes at least one transmit filter that is configured to transmit a carrier modulation signal on at least one of M different frequency bands. The transmit filter is a band-pass filter. A frequency band on which a carrier is allowed by the transmit filter to pass is consistent with a frequency band that is corresponding to a carrier on which transmitting is performed on the transmit branch. As shown in FIG. 1, the first transmit branch includes one transmit filter, and the transmit filter allows a carrier on a first frequency band to pass. Therefore, the first transmit branch is used to transmit a carrier modulation signal on the first frequency band. Similarly, a second transmit branch includes a transmit filter that allows only a carrier on a second frequency band to pass. The $M^{th}$ transmit branch includes a transmit filter that allows only a carrier on an $M^{th}$ frequency band to pass. The first frequency band to the $M^{th}$ frequency band are different from each other. Certainly, the first transmit branch may alternatively include a two-in-one transmit filter corresponding to the first frequency band and the second frequency band. Therefore, the first transmit branch allows a carrier on the first frequency band and a carrier on the second frequency band to pass. A total quantity of frequency bands on which the P transmit branches perform transmitting is M.

Therefore, when each transmit filter is an independent filter, P is equal to M. When a receive filter includes an all-in-one filter and/or a two-in-one filter, P is less than M. When the transmit filter is an M-in-one filter, P is equal to 1.

It should be noted that two different frequency bands indicate that ranges of frequencies covered by the two frequency bands do not overlap, but widths of the frequencies covered by the two frequency bands may be the same or different. For example, a frequency range of the first frequency band is 780 MHz to 800 MHz, and a frequency width is 20 MHz. A frequency range of the second frequency band is 960 MHz to 980 MHz, and a frequency width is 20 MHz.

Each receive branch includes a receive filter that is configured to receive a carrier modulation signal on at least one of the M different frequency bands. The receive filter is also a band-pass filter. If a receive filter included in a receive branch is an independent receive filter, the receive branch can receive a carrier modulation signal on only one frequency band. If a receive filter included in a receive branch is a two-in-one or all-in-one filter, the receive branch can receive carrier modulation signals on at least two frequency bands. Therefore, a frequency band on which a carrier is allowed by the receive filter to pass is consistent with a frequency band on which the receive branch receives a carrier modulation signal. For example, referring to FIG. 1, a receive filter included in the first receive branch is an independent receive filter. Therefore, the first receive branch receives only a carrier modulation signal on the first frequency band, and the receive filter allows only the carrier modulation signal on the first frequency band to pass. If a filter included in a second receive branch is a two-in-one filter corresponding to the second frequency band and a third frequency band, the second receive branch can receive a carrier modulation signal on the second frequency band and a carrier modulation signal on the third frequency band. One filter of the two-in-one filter allows the carrier modulation signal on the second frequency band to pass, and the other filter of the two-in-one filter allows the carrier modulation signal on the third frequency band to pass.

Therefore, when each receive filter is an independent filter, N is equal to M. When the receive filter includes an all-in-one filter and/or a two-in-one filter, N is less than M. When the receive filter is an M-in-one filter, N is equal to 1.

It should be noted that the two-in-one filter or the all-in-one filter is two or more independent filters packaged in one module.

The switch circuit has L input ports and at least one output port. The L input ports are used to simultaneously connect a transmit branch of the P transmit branches and a receive branch of the N receive branches, so as to implement carrier aggregation of at least two frequency bands, where the transmit branch and the receive branch are corresponding to a same frequency band. A quantity of L is determined according to an actual requirement. For example, if a receive filter included in each receive branch is an independent filter, a quantity of receive branches is also M. To implement uplink carrier aggregation of the M frequency bands, the P transmit branches and one receive branch need to be simultaneously connected. In this case, the switch circuit has at least P+1 input ports. For another example, M is greater than or equal to 3. However, according to an actual requirement, carrier aggregation of only two frequency bands may need to be implemented. Therefore, if downlink carrier aggregation of two frequency bands needs to be implemented, and a two-in-one receive filter corresponding to the two frequency bands is used, only a transmit branch on one of the two frequency bands and a corresponding receive branch of the two-in-one receive filter need to be simultaneously connected. In this case, the switch circuit needs to have only two input ports. In actual application, for ease of subsequent quantity expansion of to-be-aggregated carriers, a quantity of input ports of the switch circuit may be designed to be greater than M+N.

At least one output port is connected to an antenna or a back end circuit of an antenna. If there are two output ports, the two output ports are connected to the antenna or the back end circuit of the antenna by using, for example, a switch circuit or a diplexer circuit.

In actual application, the switch circuit may use an SKY13492-21 switch of Skyworks Solutions. The switch has 16 input ports and one output port, and therefore, the switch is also referred to as an SP16T (single-pole sixteen-throw) switch. Alternatively, an SKY13535-11 switch of Skyworks Solutions may be used. The switch has 21 input ports and two output ports, and therefore, the switch is also referred to as a DP21T (double-pole twenty one-throw) switch.

It can be learned from the foregoing description that in this embodiment of the present invention, an independent transmit filter and an independent receive filter are used, and the transmit filter and the receive filter are simultaneously connected by using the switch circuit, to implement a function of a conventional duplexer. Therefore, a structure is simple, and design difficulty is small. In addition, uplink CA or downlink CA is implemented by connecting the transmit branch and the receive branch that are corresponding to at least two frequency bands. In view of this, the radio frequency front end in this embodiment of the present invention can implement CA, and can also implement data transmission on a single carrier by connecting a transmit branch and a receive branch that are corresponding to only one frequency band. Therefore, the radio frequency front end in this embodiment of the present invention can support both single-carrier transmission and CA transmission.

Optionally, as shown in FIG. 1, the radio frequency front end in this embodiment may further include a radio frequency integrated circuit (English: Radio Frequency Integrated Circuit, RFIC for short). Certainly, in actual application, the RFIC and the radio frequency front end may be independent components. The RFIC is configured to modulate uplink data on a carrier to form a carrier modulation signal, and demodulate a received carrier modulation signal to obtain downlink data.

Figure 2:
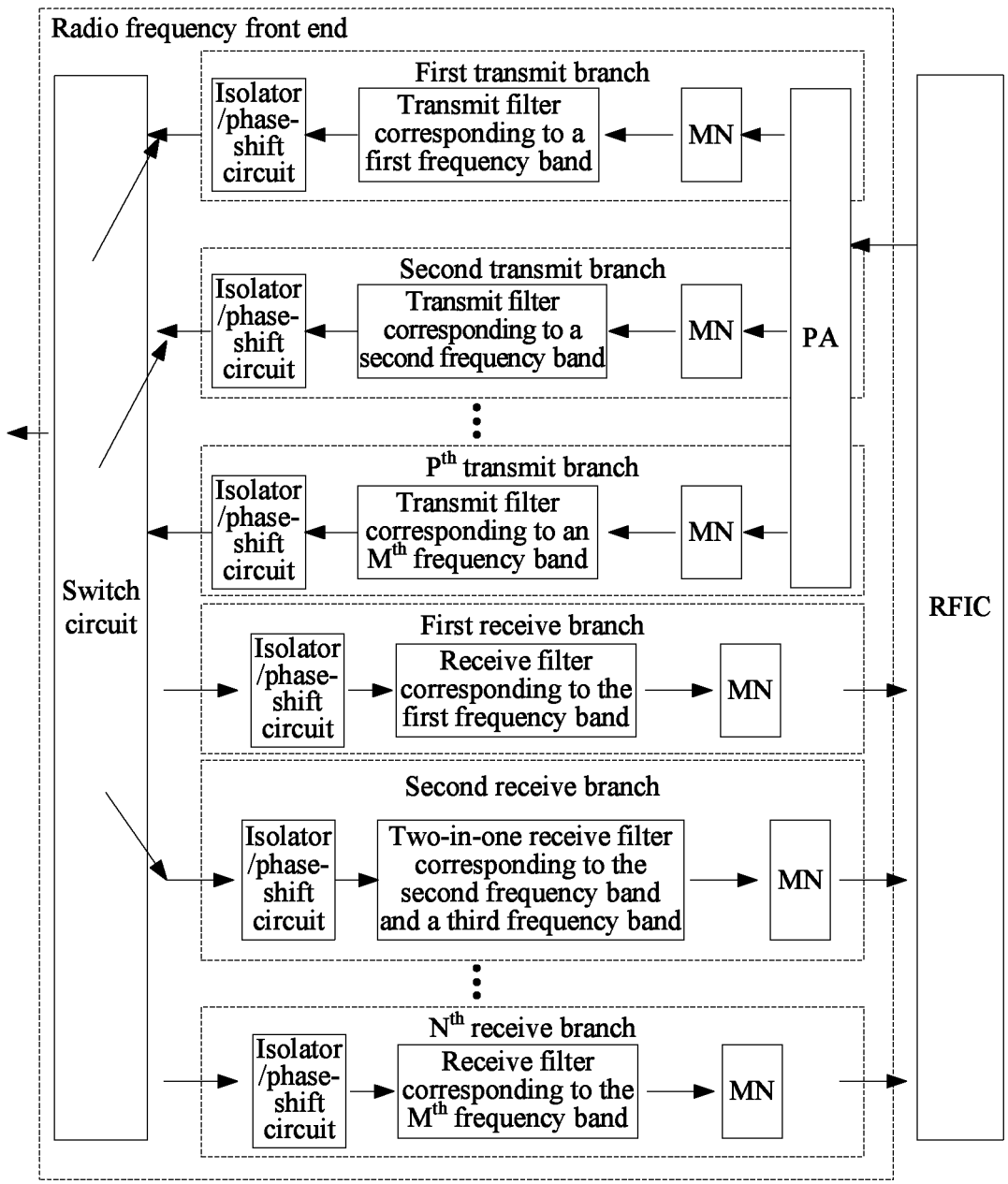
FIG. 2 is a detailed structural diagram of a radio frequency front end according to an embodiment of the present invention.

Then, referring to FIG. 2, FIG. 2 is a more detailed structural diagram of a radio frequency front end according to an embodiment of the present invention. As shown in FIG. 2, each transmit branch further includes an isolator or a phase-shift circuit. The isolator or the phase-shift circuit is disposed between the transmit filter and the switch circuit. After the isolator or the phase-shift circuit is added, when two transmit filters, or one transmit filter and two receive filters are simultaneously connected by using the switch circuit, an impedance from one transmit filter, the isolator or the phase-shift circuit and the switch circuit, to the other transmit filter or the receive filters, is an impedance in an open-circuit state. Conversely, the principle is the same.

Adding the isolator or the phase-shift circuit can reduce mutual impact between the transmit filter and another transmit filter or between the transmit filter and the receive filter.

Similarly, each transmit branch further includes an isolator or a phase-shift circuit that is disposed between the receive filter and the switch circuit. The isolator or the phase-shift circuit is used to reduce mutual impact between the receive filter and another receive filter or between the receive filter and the transmit filter.

Optionally, each transmit branch further includes a matching network (English: Matching Network, MN for short). The MN is disposed on at least one side of the transmit filter. For example, the MN may be disposed between the transmit filter and the RFIC, or between the switch circuit and the transmit filter, or on the both sides. The MN of the transmit branch is used to match a matching characteristic of the transmit filter. Specifically, the matching network of the transmit branch may adjust an impedance characteristic of the transmit filter, so that the impedance characteristic completely matches an impedance characteristic required by the RFIC, to achieve an optimal transmission effect.

Optionally, each receive branch further includes an MN that is disposed on at least one side of the receive filter. For example, the MN may be disposed between the receive filter and the RFIC, or between the switch circuit and the receive filter, or on the both sides. The MN of the receive branch is used to match a matching characteristic of the receive filter. Similarly, the matching network of the receive branch may adjust an impedance characteristic of the receive filter, so that the impedance completely matches an impedance characteristic required by the RFIC, to achieve an optimal transmission effect.

Optionally, each transmit branch further includes a power amplifier (English: Power Amplifier, PA for short). The PA is disposed between the RFIC and the transmit filter, or optionally disposed between the RFIC and the MN (as shown in FIG. 2). The PA performs power amplification on a carrier modulation signal modulated by the RFIC, so as to obtain a required transmit power.

The foregoing examples describe a possible composition of the transmit branch and the receive branch. In actual application, the transmit branch and the receive branch may further include another component, provided that CA is not affected.

Optionally, to meet a reliability requirement for an entire channel, a power tolerance of the transmit filter on a transmit branch needs to meet a transmit power requirement of the transmit branch. For example, if a transmit power of the first transmit branch needs to reach 50 watts (W), a power tolerance of the transmit filter corresponding to the first transmit branch needs to reach 50 W.

The following uses two specific examples to describe an implementation process of a radio frequency front end in an embodiment of the present invention.

Figure 3:
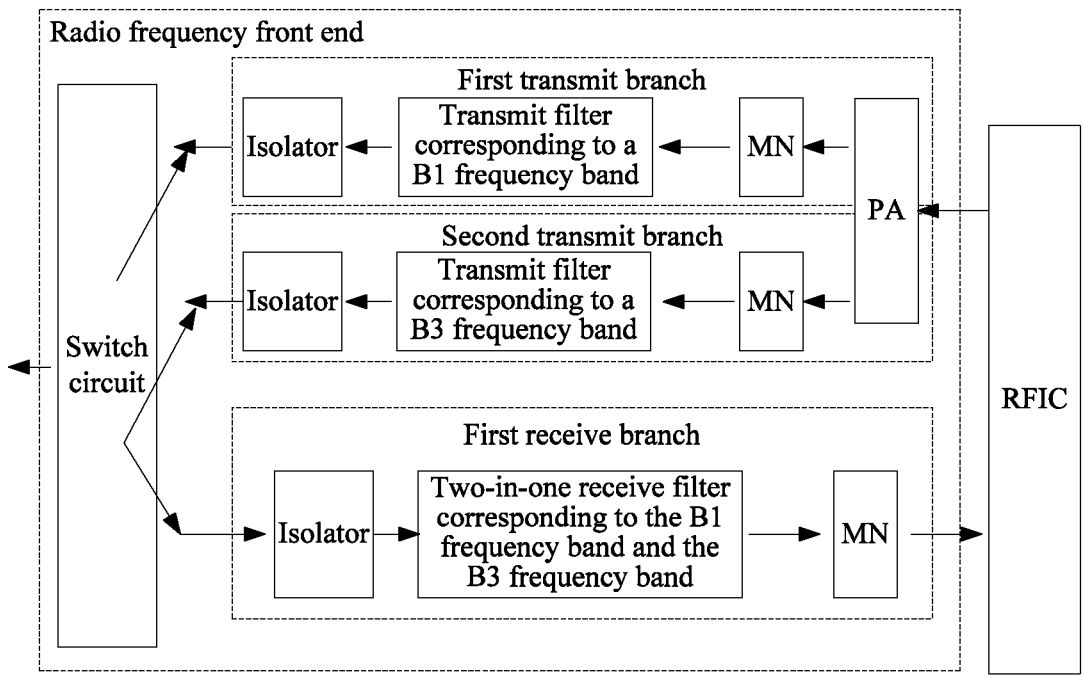
FIG. 3 is a structural diagram of another radio frequency front end according to an embodiment of the present invention.

Referring to FIG. 3, in this embodiment, it is assumed that M is 2. The M frequency bands are a B1 frequency band and a B3 frequency band. In the case of a single carrier on the B1 frequency band, the input port of the switch circuit is separately and simultaneously connected to the first transmit branch and the first receive branch that are corresponding to the B1 frequency band. However, in the case of a single carrier on the B3 frequency band, the input port of the switch circuit is separately and simultaneously connected to the second transmit branch and the first receive branch that are corresponding to the B3 frequency band. It is assumed that, at a moment, a base station delivers indication information to a terminal device, indicating that the B1 frequency band is a primary frequency band, and the B1 frequency band and the B3 frequency band are for downlink CA, the input port of the switch circuit is separately and simultaneously connected to the first transmit branch and the first receive branch. For another example, it is assumed that, at a moment, the base station delivers indication information to the terminal device, indicating that the B1 frequency band is the primary frequency band, and the B1 frequency band and the B3 frequency band are for uplink CA, the input port of the switch circuit is separately and simultaneously connected to the first transmit branch, the second transmit branch, and the first receive branch.

The terminal device works on the B frequency band that is the primary frequency band, and the B1 frequency band and the B3 frequency band are for downlink CA. Compared with a two-in-one receive filter corresponding to the B1 frequency band and the B3 frequency band, a transmit filter corresponding to the B1 frequency band is in an open-circuit state, that is, in a high impedance state, in a receive frequency band range of the B1 frequency band and the B3 frequency band; and compared with the transmit filter corresponding to the B1 frequency band, the two-in-one receive filter corresponding to the B1 frequency band and the B3 frequency band is in an open-circuit state, that is, in a high impedance state, in a transmit frequency band range of the B1 frequency band. To ensure that a transmit channel and a receive channel do not interfere with each other, an isolator is added to the receive branch. In addition, the transmit filter corresponding to the B1 frequency band should be designed to have a Smith chart impedance characteristic approximate to an open-circuit state or a high impedance state in the receive frequency band range of the B1 frequency band and the B3 frequency band. In this way, when the transmit filter corresponding to the B1 frequency band and the transmit filter corresponding to the B3 frequency band are connected simultaneously, because the transmit filters are in the high impedance state or in the open-circuit state, no signal energy leaks and no mutual impact is caused when a signal transmitted by the transmit filter corresponding to the B1 frequency band passes through the transmit filter corresponding to the B3 frequency band. Similarly, the two-in-one receive filter corresponding to the B1 frequency band and the B3 frequency band should be designed to be in the high impedance state or the open-circuit state in the transmit frequency range of the B1 frequency band and the B3 frequency band.

Figure 4:
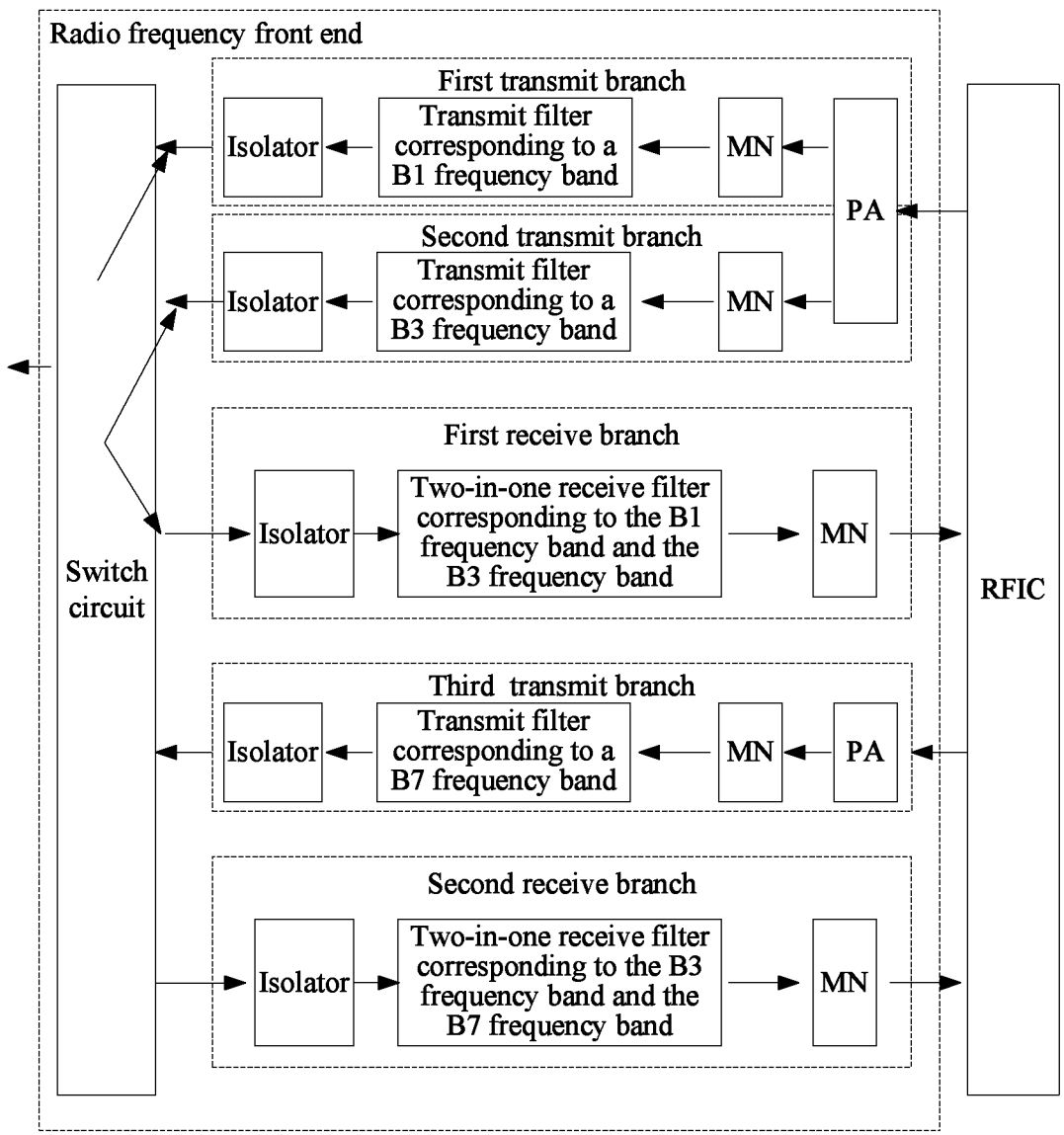
FIG. 4 is a structural diagram of still another radio frequency front end according to an embodiment of the present invention.

Still referring to FIG. 4, in this embodiment, it is assumed that M is 3. The M frequency bands are the B1 frequency band, the B3 frequency band, and a B7 frequency band, respectively. In the case of a single carrier on the B1 frequency band, the input port of the switch circuit is separately and simultaneously connected to the first transmit branch and the first receive branch that are corresponding to the B1 frequency band. However, in the case of a single carrier on the B3 frequency band, the input port of the switch circuit is separately and simultaneously connected to the second transmit branch and the first receive branch that are corresponding to the B3 frequency band. In the case of a single carrier on the B7 frequency band, the input port of the switch circuit is separately and simultaneously connected to a third transmit branch and a second receive branch that are corresponding to the B7 frequency band. It is assumed that, at a moment, the base station delivers indication information to the terminal device, indicating that the B1 frequency band is the primary frequency band, and the B1 frequency band and the B3 frequency band are for downlink CA, the input port of the switch circuit is separately and simultaneously connected to the first transmit branch and the first receive branch. For another example, it is assumed that, at a moment, the base station delivers indication information to the terminal device, indicating that the B1 frequency band is the primary frequency band, and the B1 frequency band and the B3 frequency band are for uplink CA, the input port of the switch circuit is separately and simultaneously connected to the first transmit branch, the second transmit branch, and the first receive branch. It is assumed that, at a moment, the base station delivers indication information to the terminal device, indicating that the B7 frequency band is the primary frequency band, and the B3 frequency band and the B7 frequency band are for downlink CA, the input port of the switch circuit is separately and simultaneously connected to the third transmit branch and the second receive branch.

Figure 5:
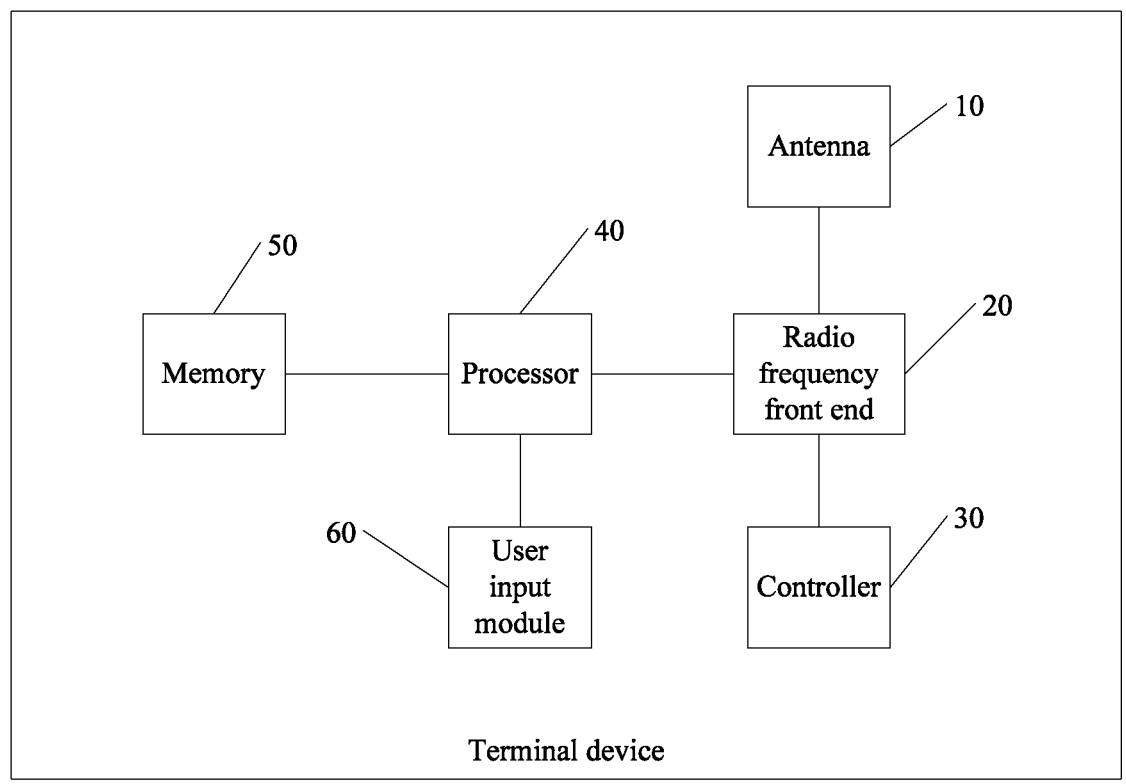
FIG. 5 is a schematic diagram of an architecture of a terminal device according to an embodiment of the present invention.

Then, referring to FIG. 5, FIG. 5 is a structural diagram of a terminal device according to an embodiment of the present invention. For example, the terminal device may be a mobile phone (or referred to as a "cellular" phone) or a computer with a mobile terminal. For example, the terminal device may be a portable, pocket-sized, handheld, computer built-in, or in-vehicle mobile apparatus, which exchanges voice and/or data with a radio access network, such as a personal communication service (English: Personal Communication Service, PCS for short) phone, a cordless phone, a Session Initiation Protocol (English: Session Initiation Protocol, SIP for short) phone set, a wireless local loop (English: Wireless Local Loop, WLL for short) station, or a personal digital assistant (English: Personal Digital Assistant, PDA for short). A wireless terminal device may also be referred to as a system, a subscriber unit (Subscriber Unit), a subscriber station (Subscriber Station), a mobile station (Mobile Station), a mobile station (Mobile), a remote station (Remote Station), a remote terminal (Remote Terminal), an access terminal (Access Terminal), a user terminal (User Terminal), a user agent (User Agent), or user equipment (User Device or User Equipment).

The terminal device includes an antenna 10, a radio frequency front end 20, a controller 30, a processor 40, a memory 50, and a user input module 60. FIG. 5 shows a terminal device with various components. However, it should be understood that not all the components shown in the figure need to be implemented. More or fewer components may be alternatively implemented. In addition, a structure between the components may be a bus structure or another structure such as a star structure. This is not specifically limited in the present invention.

The antenna 10 may include an antenna entity and a back end circuit of the antenna. Certainly, the antenna 10 may be merely the antenna entity.

The antenna 10 is configured to radiate a carrier modulation signal to space and receive an electromagnetic wave in the space.

The radio frequency front end 20 may be any one of the foregoing radio frequency front ends. An input port of a switch circuit in the radio frequency front end 20 is connected to the antenna 10.

The controller 30 is configured to control a connectivity status between the L input ports of the switch circuit in the radio frequency front end 20 and the transmit branch and between the L input ports of the switch circuit in the radio frequency front end 20 and the receive branch.

Optionally, the controller 30 controls, according to indication information delivered by a base station, a connectivity status between the L input ports and the transmit branch and between the L input ports and the receive branch.

In actual application, the controller 30 may further control, according to a decision made by the terminal device itself, the connectivity status between the L input ports and the transmit branch and between the L input ports and the receive branch.

Optionally, the controller 30 may be an independent controller, or be integrated into the switch circuit, or be integrated with the processor 40.

Optionally, the processor 40 may be a general purpose central processing unit or an application-specific integrated circuit (English: Application Specific Integrated Circuit, ASIC for short), or one or more integrated circuits used to control program execution, or a hardware circuit developed by using a field programmable gate array (English: Field Programmable Gate Array, FPGA for short).

Optionally, the processor 40 generally controls an overall operation of the terminal device. For example, the processor 40 executes control and processing related to a voice call, data communication, a video call, and the like.

Optionally, the memory 50 may store a software program for processing and control operations executed by the processor 40, or may store output or to-be-output data (such as a phonebook, a message, a static image, a video, and the like) for a long time. The memory 50 may further store data of vibration and audio signals output in various modes when a touch is applied on a touchscreen.

The memory 50 may include one or more of a read only memory (English: Read Only Memory, ROM for short), a random access memory (English: Random Access Memory, RAM for short), or a magnetic disk memory. There is one or more memories 50.

The user input module 60 may generate data according to a command input by a user, to control various operations on the terminal device. The user input module 60 allows the user to input various types of information, and may include one or more of a keyboard, a touchpad, a scroll wheel, or a joystick. When the touchpad is overlapping in a layer manner on a display, a touchscreen can be formed.

Figure 6:
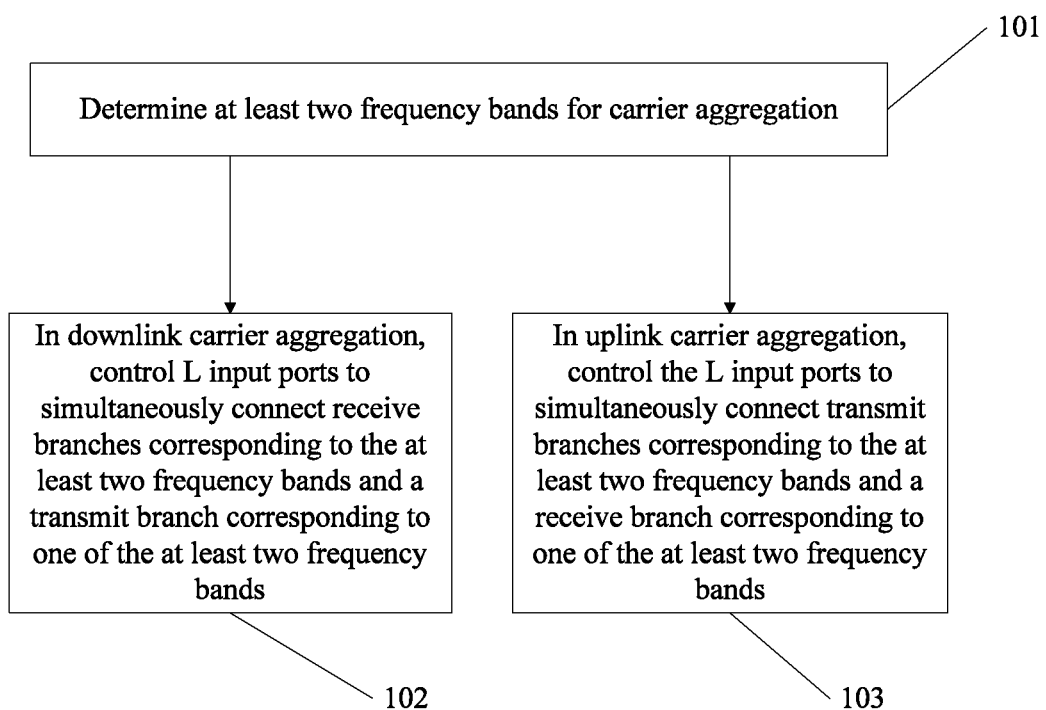
FIG. 6 is a flowchart of a carrier aggregation method according to an embodiment of the present invention.

Then, referring to FIG. 6, FIG. 6 is a flowchart of a carrier aggregation method implemented on the terminal device shown in FIG. 5 or a similar terminal device. The method includes the following steps.

Step 101: Determine at least two frequency bands for carrier aggregation.

Step 102: In downlink carrier aggregation, control the L input ports to simultaneously connect receive branches corresponding to the at least two frequency bands and a transmit branch corresponding to one of the at least two frequency bands.

Step 103: In uplink carrier aggregation, control the L input ports to simultaneously connect transmit branches corresponding to the at least two frequency bands and a receive branch corresponding to one of the at least two frequency bands.

Optionally, step 101 includes: determining the at least two frequency bands according to indication information received from a network-side device, where the indication information is used to indicate the at least two frequency bands. This step may be executed by the controller 30.

For example, the radio frequency front end 20 uses the structure shown in FIG. 4. It is assumed that the current terminal device is working in a single carrier mode and uses a carrier on the B1 frequency band. Therefore, the base station may deliver indication information to the terminal device by using the carrier on the B1 frequency band. The indication information indicates that the B1 frequency band and the B3 frequency band are used for downlink CA. The processor 40 or the controller 30 of the terminal device parses the indication information to learn that the B1 frequency band and the B3 frequency band need to be used for downlink CA. Therefore, the controller 30 controls the input port of the switch circuit to simultaneously connect the first receive branch and the first transmit branch or the second transmit branch that are corresponding to the B1 frequency band and the B3 frequency band.

Specifically, either the first transmit branch or the second transmit branch may be chosen. Alternatively, the indication information may further indicate a primary frequency band of the at least two frequency bands in step 101, and the transmit branch that is simultaneously connected is the transmit branch corresponding to the primary frequency band. In this example, if the B1 frequency band is indicated as the primary frequency band, the simultaneously connected branches are the first receive branch and the first transmit branch.

If the indication information indicates that the B1 frequency band and the B3 frequency band are used for uplink CA, the controller 30 controls the input port of the switch circuit to simultaneously connect the first transmit branch corresponding to the B1 frequency band, the second transmit branch corresponding to the B3 frequency band, and the receive branch corresponding to the B1 frequency band or the B3 frequency band. Specifically, either the receive branch corresponding to the B1 frequency band or the receive branch corresponding to the B3 frequency band may be chosen. Alternatively, the receive branch may be selected according to the primary frequency band in the indication information. For example, if the B1 frequency band is indicated as the primary frequency band, the receive branch corresponding to the B1 frequency band needs to be simultaneously connected. In the example shown in FIG. 4, the two-in-one receive filter corresponding to the B1 frequency band and the B3 frequency band is used, and the corresponding receive branches are the first receive branch. Therefore, the branches that are simultaneously connected finally are the first transmit branch, the second transmit branch, and the first receive branch.

In actual application, step 101 may have another implementation. Specifically, step 101 includes: determining the at least two frequency bands according to an actual requirement. For example, if data that needs to be transmitted by the current terminal device is large, it is determined that uplink CA needs to be performed, and then frequency bands to be used for uplink CA are determined according to a required transmission bandwidth. Other steps are similar to those in a case in which the network-side device sends the indication information, and details are not described again.

The base station or the network-side device in this specification may be a base transceiver station (English: Base Transceiver Station, BTS for short) in the Global System for Mobile Communications (English: Global System of Mobile communication, GSM for short) or the Code Division Multiple Access (English: Code Division Multiple Access, CDMA for short) system, or a NodeB (English: NodeB, NB for short) in the Wideband Code Division Multiple Access (English: Wideband Code Division Multiple Access, WCDMA for short) system, or an evolved NodeB (English: Evolved Node B, eNB or eNodeB for short) in the Long Term Evolution (English: Long Term Evolution, LTE for short) system, or a relay station or an access point, or a base station in a future 5G network. This is not limited in this specification.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A radio frequency front end, comprising:

P transmit branches, wherein each transmit branch is used to transmit a carrier modulation signal on at least one of M different frequency bands, wherein each transmit branch comprises at least one transmit filter, wherein the transmit filter is a band-pass filter, wherein a frequency band on which a carrier is allowed by the transmit filter to pass is consistent with the at least one frequency band on which transmitting is performed on each transmit branch, wherein P is an integer greater than or equal to 1 and less than or equal to M, and wherein M is an integer greater than or equal to 2;

N receive branches, wherein each receive branch is used to receive a carrier modulation signal on at least one of the M different frequency bands, wherein each receive branch comprises at least one receive filter, wherein the receive filter is a band-pass filter, wherein a frequency band on which a carrier is allowed by the receive filter to pass is consistent with the at least one frequency band on which receiving is performed on each receive branch, and wherein N is an integer greater than or equal to 1 and less than or equal to M; and a switch circuit having L input ports and at least one output port, wherein the at least one output port is connected to an antenna or a back end circuit of an antenna, wherein the L input ports are used to simultaneously connect a transmit branch of the P transmit branches and a receive branch of the N receive branches, wherein the transmit branch and the receive branch are corresponding to a same frequency band, wherein L is an integer greater than or equal to 2, and wherein:

in downlink carrier aggregation for at least two frequency bands, the L input ports simultaneously connect receive branches corresponding to the at least two frequency bands and a transmit branch corresponding to one of the at least two frequency bands; and in uplink carrier aggregation for the at least two frequency bands, the L input ports simultaneously connect transmit branches corresponding to the at least two frequency bands and a receive branch corresponding to one of the at least two frequency bands.

2. The radio frequency front end according to claim 1, wherein each transmit branch further comprises an isolator or a phase-shift circuit, wherein the isolator or the phase-shift circuit is disposed between the transmit filter and the switch circuit, and wherein the isolator or the phase-shift circuit is used to reduce mutual impact between the transmit filter and another transmit filter or the receive filter.

3. The radio frequency front end according to claim 1, wherein each transmit branch further comprises a matching network, wherein the matching network of each transmit branch is disposed on at least one side of the transmit filter, and wherein the matching network of each transmit branch is used to match a matching characteristic of the transmit filter.

4. The radio frequency front end according to claim 1, wherein each receive branch further comprises a matching network, wherein the matching network of each receive branch is disposed on at least one side of the receive filter, and wherein the matching network of each receive branch is used to match a matching characteristic of the receive filter.

5. The radio frequency front end according to claim 1, wherein a quantity of the at least one frequency band on which receiving is performed on each receive branch is one, wherein the receive filter is an independent filter, and wherein N is equal to M.

6. The radio frequency front end according to claim 1, wherein a quantity of the at least one frequency band on which receiving is performed on each receive branch is two or more, and the receive filter is a two-in-one or all-in-one filter.

7. The radio frequency front end according to claim 1, wherein a power tolerance of the transmit filter is transmit power of the transmit branch.

8. A carrier aggregation method, applied to a terminal device, wherein the terminal device comprises:

an antenna, the antenna configured to radiate a modulation signal to space and receive an electromagnetic wave in the space;

a radio frequency front end, the radio frequency front end comprising:

P transmit branches, wherein each transmit branch is used to transmit a carrier modulation signal on at least one of M different frequency bands, wherein each transmit branch comprises at least one transmit filter, wherein the transmit filter is a band-pass filter, wherein a frequency band on which a carrier is allowed by the transmit filter to pass is consistent with the at least one frequency band on which transmitting is performed on each transmit branch, wherein P is an integer greater than or equal to 1 and less than or equal to M, and wherein M is an integer greater than or equal to 2;

N receive branches, wherein each receive branch is used to receive a carrier modulation signal on at least one of the M different frequency bands, wherein each receive branch comprises at least one receive filter, wherein the receive filter is a band-pass filter, wherein a frequency band on which a carrier is allowed by the receive filter to pass is consistent with the at least one frequency band on which receiving is performed on each receive branch, and wherein N is an integer greater than or equal to 1 and less than or equal to M; and a switch circuit having L input ports and at least one output port, wherein the at least one output port is connected to an antenna or a back end circuit of an antenna, wherein the L input ports are used to simultaneously connect a transmit branch of the P transmit branches and a receive branch of the N receive branches, wherein the transmit branch and the receive branch are corresponding to a same frequency band, and wherein L is an integer greater than or equal to 2, wherein the output port is connected to the antenna; and a controller, the controller configured to control a connectivity status between the L input ports and the transmit branch and between the L input ports and the receive branch;

wherein the method comprises:

determining at least two frequency bands for carrier aggregation;

in downlink carrier aggregation, controlling L input ports to simultaneously connect receive branches corresponding to the at least two frequency bands and a transmit branch corresponding to one of the at least two frequency bands; and in uplink carrier aggregation, controlling the L input ports to simultaneously connect transmit branches corresponding to the at least two frequency bands and a receive branch corresponding to one of the at least two frequency bands.

9. The method according to claim 8, wherein the determining at least two frequency bands for carrier aggregation comprises:

determining the at least two frequency bands according to indication information received from a network-side device, wherein the indication information is used to indicate the at least two frequency bands.

10. The method according to claim 9, wherein the indication information is further used to indicate a primary frequency band of the at least two frequency bands, and the one of the at least two frequency bands is the primary frequency band.

11. The method according to claim 8, wherein each transmit branch further comprises an isolator or a phase-shift circuit, wherein the isolator or the phase-shift circuit is disposed between the transmit filter and the switch circuit, and wherein the isolator or the phase-shift circuit is used to reduce mutual impact between the transmit filter and another transmit filter or the receive filter.

12. The method according to claim 8, wherein each transmit branch further comprises a matching network, wherein the matching network of each transmit branch is disposed on at least one side of the transmit filter, and wherein the matching network of each transmit branch is used to match a matching characteristic of the transmit filter.

13. The method according to claim 8, wherein each receive branch further comprises a matching network, wherein the matching network of each receive branch is disposed on at least one side of the receive filter, and wherein the matching network of each receive branch is used to match a matching characteristic of the receive filter.

14. The method according to claim 8, wherein a quantity of the at least one frequency band on which receiving is performed on each receive branch is one, wherein the receive filter is an independent filter, and wherein N is equal to M.

15. The method according to claim 8, wherein a quantity of the at least one frequency band on which receiving is performed on each receive branch is two or more, and the receive filter is a two-in-one or all-in-one filter.

16. The method according to claim 8, wherein a power tolerance of the transmit filter is transmit power of the transmit branch.

\* \* \* \* \*